(12) United States Patent
Rathour et al.

(10) Patent No.: US 11,317,034 B2
(45) Date of Patent: Apr. 26, 2022

(54) ELECTRONIC DEVICE AND OPERATING METHOD OF CONTROLLING BRIGHTNESS OF LIGHT SOURCE

(71) Applicant: Samsung Electronics Co., Ltd., Suwon-si (KR)

(72) Inventors: Sunil Rathour, Noida (IN); Nitesh Goyal, Ghaziabad (IN); Pranav Jadav, Surendranagar (IN); Ankit Agarwal, Ghaziabad (IN); Avinash Thakur, Ghaziabad (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/511,476

(22) Filed: Jul. 15, 2019

(65) Prior Publication Data

US 2020/0045218 A1     Feb. 6, 2020

(30) Foreign Application Priority Data

Jul. 13, 2018    (IN) .............................. 201811026228
Jun. 18, 2019    (IN) ............................ 2018 11026228
Jul. 8, 2019    (KR) ........................ 10-2019-0082229

(51) Int. Cl.
    *H04N 5/235*     (2006.01)
    *G05D 25/02*     (2006.01)
    (Continued)

(52) U.S. Cl.
    CPC ............ *H04N 5/2354* (2013.01); *G01J 1/124* (2013.01); *G05D 25/02* (2013.01);
    (Continued)

(58) Field of Classification Search
    CPC ................................................... H04N 5/2354
    (Continued)

(56) References Cited

U.S. PATENT DOCUMENTS 8,493,370 B2    7/2013    Gettemy
9,734,766 B2    8/2017    Sakaigawa et al.
(Continued)

FOREIGN PATENT DOCUMENTS

CN        101399924 A    4/2009
CN        101534395 A    9/2009
(Continued)

OTHER PUBLICATIONS

International Search Report dated Oct. 24, 2019; issued in an International Application No. PCT/KR2019/008724.
(Continued)

*Primary Examiner* — Joel W Fosselman
(74) *Attorney, Agent, or Firm* — Jefferson IP Law, LLP

(57) ABSTRACT

An electronic device for controlling a brightness of a light source and an operating method of the electronic device are provided. According to the electronic device and the operating method, an image including an ambient environment of a light source is captured, information of an exposure of the captured image is obtained, information about a brightness of the ambient environment of the light source is determined based on the information about the exposure, and a brightness of the light source is controlled based on the determined information about the brightness of the ambient environment.

17 Claims, 13 Drawing Sheets

(51) Int. Cl.
*G01J 1/12* (2006.01)
*H04M 1/72454* (2021.01)

(52) U.S. Cl.
CPC .... *H04M 1/72454* (2021.01); *H04M 2250/12* (2013.01); *H04M 2250/52* (2013.01)

(58) Field of Classification Search
USPC .......................................................... 348/370
See application file for complete search history.

(56) References Cited

U.S. PATENT DOCUMENTS

| | | | |
|---|---|---|---|
| 9,826,149 B2 | 11/2017 | Chalom et al. | |
| 10,477,115 B2 | 11/2019 | Xie et al. | |
| 11,044,414 B2 | 6/2021 | Kim et al. | |
| 2009/0160944 A1* | 6/2009 | Trevelyan | H04N 5/2354 348/187 |
| 2009/0175555 A1* | 7/2009 | Mahowald | H04N 5/2351 382/274 |
| 2009/0181719 A1 | 7/2009 | Cho | |
| 2009/0231364 A1 | 9/2009 | Tsai | |
| 2015/0070337 A1 | 3/2015 | Bell et al. | |
| 2015/0262024 A1* | 9/2015 | Braithwaite | G06K 9/2036 382/118 |
| 2015/0351204 A1 | 12/2015 | Hershberg et al. | |
| 2016/0133199 A1* | 5/2016 | Chu | G09G 3/20 345/690 |
| 2017/0237889 A1 | 8/2017 | Wang et al. | |
| 2018/0012565 A1 | 1/2018 | Dunn | |
| 2018/0122335 A1 | 5/2018 | Chen et al. | |

FOREIGN PATENT DOCUMENTS

| | | |
|---|---|---|
| CN | 103414834 A | 11/2013 |
| CN | 104039040 A | 9/2014 |
| CN | 104219853 A | 12/2014 |
| CN | 104754134 A | 7/2015 |
| CN | 105530437 A | 4/2016 |
| CN | 107454342 A | 12/2017 |
| CN | 107507602 A | 12/2017 |
| KR | 10-2005-0080365 A | 8/2005 |
| WO | 2016/074806 A1 | 5/2016 |
| WO | 2017-174582 A1 | 10/2017 |
| WO | 2018/101676 A1 | 6/2018 |

OTHER PUBLICATIONS

Indian Search Report dated Oct. 22, 2020, issued in Indian Patent Application No. 201811026228.
Chinese Office Action dated Apr. 21, 2021, issued in Chinese Patent Application No. 201980046793.1.
Extended European Search Report dated Aug. 11, 2021, issued in European Patent Application No. 19833778.4-1202.
Chinese Office Action dated Nov. 22, 2021, issued in Chinese Application No. 201980046793.1.
Chinese Ofce Action dated Feb. 9, 2022, issued in Chinese Application No. 201980046793.1.

* cited by examiner

FIG. 8
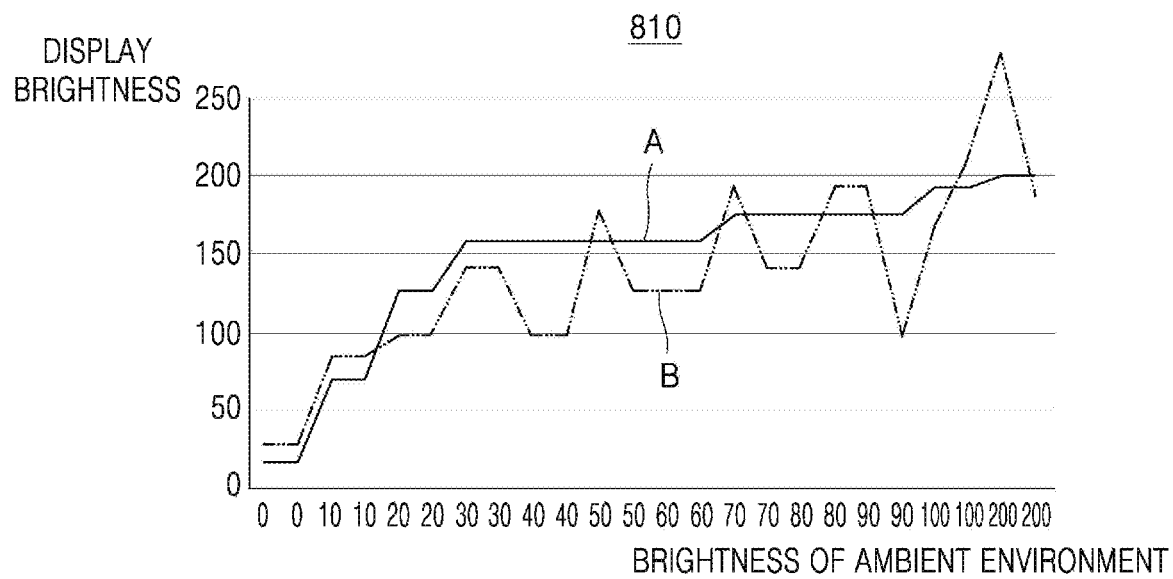
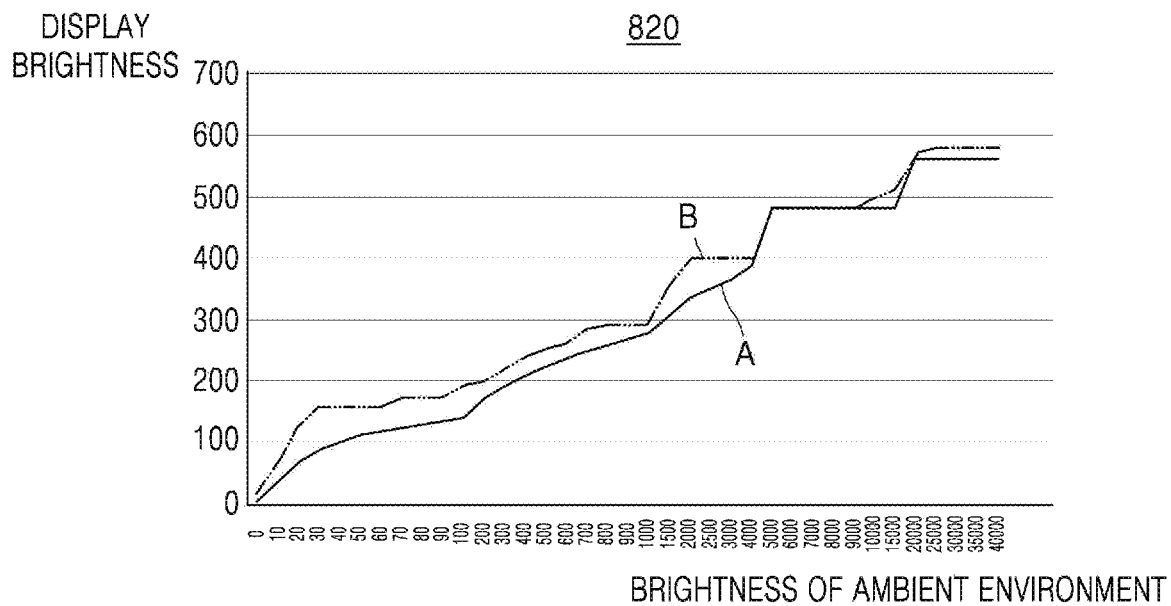

ELECTRONIC DEVICE AND OPERATING METHOD OF CONTROLLING BRIGHTNESS OF LIGHT SOURCE

CROSS-REFERENCE TO RELATED APPLICATION(S)

This application is based on and claims priority under 35 U.S.C. § 119 of an Indian patent application number 201811026228, filed on Jul. 13, 2018, and an Indian patent application number 201811026228, filed on Jun. 18, 2019, in the Indian Patent Office, and of a Korean patent application number 10-2019-0082229, filed on Jul. 8, 2019, in the Korean Intellectual Property Office, the disclosure of each of which are incorporated by reference herein in its entirety.

BACKGROUND

1. Field

The disclosure relates to an electronic device and an operating method of controlling a brightness of a light source.

2. Description of Related Art

A user may conveniently view a display when the display is displayed with an appropriate brightness according to the brightness of the ambient environment. For example, when a display is too bright compared to the brightness of the ambient environment, the user's eyes may experience fatigue due to glare. When the display is too dark compared to the brightness of the ambient environment, the user may have difficulty in recognizing information displayed on the display.

Thus, an electronic device includes an illuminance sensor sensing a brightness of the ambient environment and may control a brightness of the display according to the brightness of the ambient environment sensed using the illuminance sensor.

However, for cost reduction, a method of determining a brightness of the ambient environment and controlling a brightness of various types of light sources including a display according to the determined brightness of the ambient environment is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic device and an operating method of controlling a brightness of a light source.

Another aspect of the disclosure is to provide an apparatus and method for a computer-readable recording medium having recorded thereon a program for executing the method on a computer. The technical problem to be solved is not limited to the technical problems as described above, and other technical problems may exist.

Additional aspects will be set forth in part in the description which follows and, in part, will be apparent from the description, or may be learned by practice of the presented embodiments.

In accordance with an aspect of the disclosure, a method of controlling a brightness of a light source by an electronic device is provided. The method includes capturing an image including an ambient environment of the light source, obtaining information about an exposure of the captured image, determining information about a brightness of the ambient environment of the light source based on the information about the exposure, and controlling the brightness of the light source based on the determined information about the brightness of the ambient environment.

In accordance with another aspect of the disclosure, an electronic device is provided. The electronic device includes a display, a camera, a memory storing one or more instructions, and at least one processor configured to execute the one or more instructions stored in the memory, wherein the at least one processor is configured to control the camera to capture an image including an ambient environment of the display, obtain information about an exposure of the captured image, and determine information about a brightness of the ambient environment of the display based on the information about the exposure, and control a brightness of the display based on the determined information about the brightness of the ambient environment.

In accordance with another aspect of the disclosure, a recording medium having stored therein a program configured to perform the above-described method is included.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates an example in which a brightness of a light source is controlled based on a brightness of an ambient environment, according to an embodiment of the disclosure;

Throughout the drawings, like reference numerals will be understood to refer to like parts, components, and structures.

DETAILED DESCRIPTION

Figure 1:
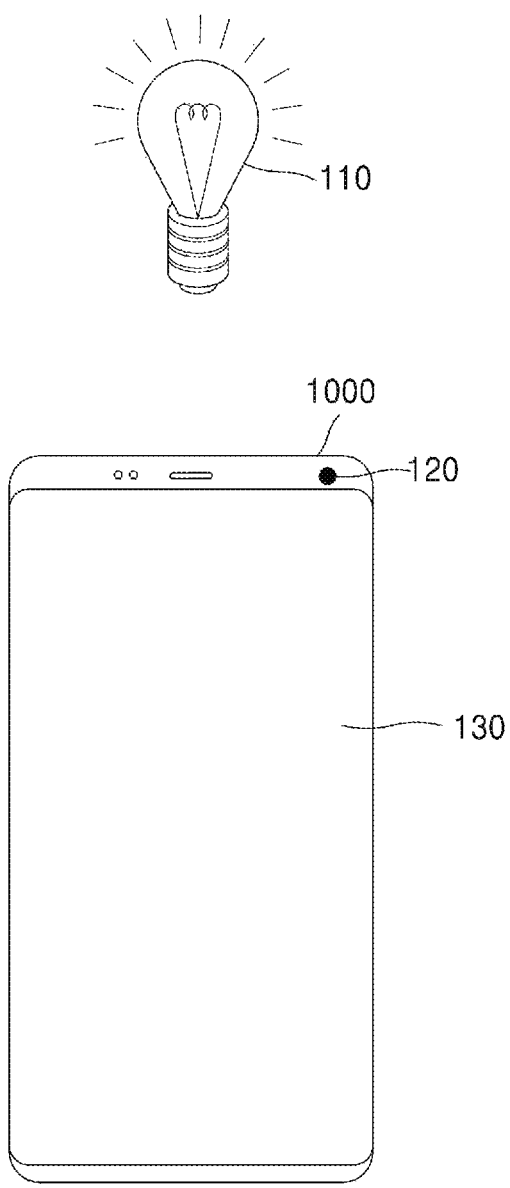
FIG. 1 illustrates an example of controlling a light source according to a brightness of an ambient environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will also be understood that when an element is referred to as being "connected to" another element, it can be directly connected to the other element, or it can be electrically connected to the other element and intervening elements may be present. It will also be understood that when a component "includes" an element, unless there is another opposite description thereto, it should be understood that the component does not exclude another element but may further include another element.

Throughout the disclosure, the expression "at least one of a, b or c" indicates only a, only b, only c, both a and b, both a and c, both b and c, all of a, b, and c, or variations thereof.

An artificial intelligence-related function according to the disclosure is operated via a processor and a memory. A processor may include one or more processors. The one or more processors may include a general-use processor such as a central processing unit (CPU), an application processor (AP), or a digital signal processor (DSP), a graphics processor such as a graphics processing unit (GPU), a vision processing unit (VPU), or an artificial intelligence processor such as a neural processing unit (NPU). One or more processors control processing of input data according to predefined operating rules or an artificial intelligence model each stored in a memory. Alternatively, when one or more processors are artificial intelligence processors, the artificial intelligence-only processors may be designed in a hardware structure specialized for processing a particular artificial intelligence model.

The predefined operating rules or the artificial intelligence model may be provided through learning. Being provided by learning indicates that a basic artificial intelligence model is trained through a learning algorithm by using multiple pieces of training data to make predefined operating rules or an artificial intelligence model that is set to perform desired characteristics (or purpose). The learning as described above may be performed on a device on which artificial intelligence is conducted according to an embodiment of the disclosure or on a separate server and/or system. Examples of the learning algorithm include supervised learning, unsupervised learning, semi-supervised learning or reinforcement learning, but are not limited thereto.

An artificial intelligence model may include a plurality of neural network layers. Each of the plurality of neural network layers has a plurality of weight values, and performs a neural network operation by performing an operation with an operation result of a previous layer and the plurality of weight values. The plurality of neural network layers of the plurality of neural network layers may be optimized by a learning result of an artificial intelligence model. For example, the plurality of weight values may be renewed such that loss values or cost values obtained by an artificial intelligence model during a learning process are reduced or minimized. An artificial neural network may include, for example, a convolutional neural network (CNN), a deep neural network (DNN), a recurrent neural network (RNN), a restricted Boltzmann machine (RBM), a deep belief network (DMB), a bidirectional recurrent deep neural network (BRDNN) or a deep Q-Networks, but is not limited thereto.

Hereinafter, the disclosure will be described in detail with reference to the attached drawings.

FIG. 1 illustrates an example of controlling a light source according to a brightness of an ambient environment, according to an embodiment of the disclosure.

Referring to FIG. 1, an electronic device 1000 includes a camera 120, and may determine information about a brightness of an ambient environment in which at least one illumination device 110 is included, based on an image captured using the camera 120. A brightness of the ambient environment may be determined by the at least one illumination device 110 present in the ambient environment. An image captured according to an embodiment of the disclosure may include an image of the ambient environment of a light source, a brightness of which is to be controlled by the electronic device 1000.

The electronic device 1000 according to an embodiment of the disclosure may determine information about a brightness of the ambient environment by using the camera 120, without including an additional illuminance sensor to determine information about a brightness of the ambient environment. In addition, the electronic device 1000 may control a brightness of a light source based on information about the determined brightness of the ambient environment.

The electronic device 1000 according to an embodiment of the disclosure may be a device that performs various operations related to an operation of controlling a light source according to a brightness of the ambient environment and may be implemented in various forms. For example, the electronic device 1000 described in the disclosure may be a digital camera, a smart phone, a laptop computer, a tablet personal computer (PC), an electronic book (e-book) terminal, a terminal for digital broadcasting, a personal digital assistant (PDA), a portable multimedia player (PMP), a navigation device, an MP3 player, an artificial intelligence speaker, a robot vacuum cleaner, a home appliance or the like, but is not limited thereto.

In addition, the electronic device 1000 described in the specification may be a wearable device worn by a user. A wearable device may include at least one of an accessory-type device (e.g., a watch, a ring, a bracelet, an anklet, a necklace, glasses, contact lenses), a head-mounted device HMD), a fabric- or clothes-integrated device (e.g., electronic clothes), a body attaching-type device (e.g., a skin pad), or a bioimplantable device (e.g., an implantable circuit), but is not limited thereto. Hereinafter, a smart phone will be described as an example of the electronic device 1000 for convenience of description.

According to an embodiment of the disclosure, the electronic device 1000 may determine information about a brightness of an ambient environment based on information of an exposure of an image captured using the camera 120, and adjust a brightness of a light source based on the information of the brightness of the ambient environment.

A light source, a brightness of which is adjustable, according to an embodiment of the disclosure may be a display 130 of the electronic device 1000. The light source having an adjustable brightness according to an embodiment of the disclosure is not limited to the above example, and may also be other illumination devices of the electronic device 1000 or another light source present outside the electronic device 1000.

The camera 120 according to an embodiment of the disclosure may capture an image of an ambient environment of the display 130, a brightness of which is to be adjusted. For example, the electronic device 1000 may determine information about the brightness of the ambient environment based on an image of the ambient environment captured using the camera 120 which is on a front side provided around the display 130.

The camera 120 according to an embodiment of the disclosure may capture an image of an ambient environment of a light source (for example, the display 130), a brightness of which is to be adjusted by the electronic device 1000 under various exposure conditions. According to an embodiment of the disclosure, a brightness of a captured image, a definition of the image, the degree of shaking of the image, or the like may vary according to at least one exposure condition set during image capturing. According to an embodiment of the disclosure, each time when an image is captured, an exposure condition of the image may be automatically determined based on various types of information related to image qualities such as a brightness of a captured image and definition and the degree of shaking of the image, and an image may be captured based on the determined exposure condition. For example, the camera 120 may set an exposure condition, under which an image of a highest quality may be captured, and capture an image according to the set exposure condition.

An exposure condition of an image according to an embodiment of the disclosure may be automatically determined each time when an image is captured or may be manually determined by a user. However, according to an embodiment of the disclosure, when an image is captured to determine a brightness of an ambient environment of the image, an image is automatically captured without a user's input for image capturing, and thus, an exposure condition of the image may be automatically determined without a user's input.

For example, an exposure condition of an image under which an image of a highest quality may be captured may be automatically determined based on various types of sensor data sensed using at least one sensor included in the electronic device 1000, during image capturing An exposure condition of an image according to an embodiment of the disclosure may include at least one of an aperture value, a shutter speed, or an ISO sensitivity.

An aperture value according to an embodiment of the disclosure refers to a value for adjusting an amount of light passing through a lens of the camera 120. For example, the greater an aperture value, the larger is a size of a hole through which light passes through in the camera 120, and thus, the amount of light passing through the lens increases. According to an embodiment of the disclosure, an extent to which an image is clearly viewed, a brightness of an image or the like may be varied according to an aperture value.

A shutter speed according to an embodiment of the disclosure denotes a length of time that a shutter is opened. The higher the shutter speed, the shorter an image being captured is exposed to light, and thus the image is dark, whereas a clear image of a moving object may be captured. The lower the shutter speed, the longer an image being captured is exposed to light, and thus the image is bright, whereas an image of moving object may be blurred. Accordingly, according to an embodiment of the disclosure, a brightness of an image, a definition of an image or the like may be varied according to a shutter speed.

An ISO sensitivity according to an embodiment of the disclosure denotes sensitivity with respect to light. The higher the ISO sensitivity, the higher is sensitivity with respect to light, and thus an image may be brighter but noise included in the image may be increased. On the other hand, the lower the ISO sensitivity, the lower is sensitivity with respect to light, and thus an image may be darker but noise included in the image may be reduced. Accordingly, according to an embodiment of the disclosure, a brightness of an image, details or a resolution of an image or the like may be varied according to an ISO sensitivity.

At least one of the aperture value, the shutter speed, or the ISO sensitivity described above may be automatically determined using various methods to enable capturing of an image in an optimal state, and an image may be captured according to the determined exposure condition. For example, at least one of the aperture value, the shutter speed, or the ISO sensitivity described above may be automatically determined to enable capturing of an image of a highest quality by considering various characteristics of an image such as a brightness of an image, details or a resolution of an image, a definition of an image, or the like.

Accordingly, an exposure condition of an image described above may be automatically determined such that a brightness of an image is in an optimal state, from among features of an image related to image quality, and a brightness of an image may be varied according to a brightness of an ambient environment. Accordingly, the electronic device 1000 according to an embodiment of the disclosure may determine information about a brightness of the ambient environment based on an exposure condition of an image.

According to an embodiment of the disclosure, as a brightness of an image is greater the greater a brightness of an ambient environment, at least one exposure condition from among a smaller aperture value, a higher shutter speed, or a lower ISO sensitivity may be set. On the other hand, the darker a brightness of an ambient environment, the lower a brightness of an image, and thus, at least one exposure condition from among a greater aperture value, a lower shutter speed, or higher ISO sensitivity may be set.

According to an embodiment of the disclosure, information about a brightness of the ambient environment may be determined based on information about an exposure of a captured image. For example, the smaller an aperture value of a captured image or the higher a shutter speed of a captured image or the lower an ISO sensitivity of a captured image, the greater may be a brightness value of an ambient environment.

For example, a brightness value of an ambient environment may be determined based on Tables 1 and 2 below.

according to an embodiment of the disclosure is identical to a shutter speed described above and denotes a length of time that a shutter is opened.

According to an embodiment of the disclosure, an exposure value (EV) may be determined according to Equation 1 based on an exposure time, and a PV may be determined based on Table 3 according to a determined EV. mRange( ) may be determined based on the maximum and minimum allowed exposure time set in the camera.

$$EV \text{ (Exposure Value)} = 255 - (\text{int})(\text{exposure time} * 255 / m\text{Range}(\ )) \quad \text{Equation 1}$$

TABLE 1

| | | | | | | | shutter speed | | | | | | |
|---|---|---|---|---|---|---|---|---|---|---|---|---|---|
| | | 4 | 2 | 1 | 1/2 | 1/4 | 1/8 | 1/15 | 1/30 | 1/60 | 1/125 | 1/250 | 1/500 |
| exposure value | −2 | f/1 | | | | | | | | | | | |
| | −1 | | | | | | | | | | | | |
| | 0 | f/2 | f/1.4 | f/1 | | | | | | | | | |
| | 1 | f/2.8 | f/2 | f/1.4 | f/1 | | | | | | | | |
| | 2 | f/4 | f/2.8 | f/2 | f/1.4 | f/1 | | | | | | | |
| | 3 | f/5.6 | f/4 | f/2.8 | f/2 | f/1.4 | f/1 | | | | | | |
| | 4 | f/8 | f/5.6 | f/4 | f/2.8 | f/2 | f/1.4 | f/1 | | | | | |
| | 5 | f/11 | f/8 | f/5.6 | f/4 | f/2.8 | f/2 | f/1.4 | f/1 | | | | |
| | 6 | f/16 | f/11 | f/8 | f/5.6 | f/4 | f/2.8 | f/2 | f/1.4 | f/1 | | | |
| | 7 | f/22 | f/16 | f/11 | f/8 | f/5.6 | f/4 | f/2.8 | f/2 | f/1.4 | f/1 | | |
| | 8 | f/32 | f/22 | f/16 | f/11 | f/8 | f/5.6 | f/4 | f/2.8 | f/2 | f/1.4 | f/1 | |
| | 9 | | f/32 | f/22 | f/16 | f/11 | f/8 | f/5.6 | f/4 | f/2.8 | f/2 | f/1.4 | f/1 |
| | 10 | | | f/32 | f/22 | f/16 | f/11 | f/8 | f/5.6 | f/4 | f/2.8 | f/2 | f/1.4 |
| | | | | | | aperture value | | | | | | | | |

TABLE 2

| Range of Exposure Value | PV |
|---|---|
| <=$R_1$ | $X_1$ |
| $R_2$-$R_3$ | $X_2$ |
| $R_4$-$R_x$ | $X_n$ |

According to an embodiment of the disclosure, in Table 1, an exposure value may be determined according to an aperture value and a shutter speed, and in Table 2, a property value (PV) according to an exposure value may be determined. The PV may denote a brightness value of an ambient environment that may be determined based on exposure information. According to an embodiment of the disclosure, a PV determined according to an exposure value may be used in determining a final brightness value of a light source by further considering a luminance value of an image according to Equation 1 below.

In Table 2, values of $R_1$, $R_2$, $R_3$, $R_4$, $R_x$, $X_1$, $X_2$, and $X_n$ may be respectively determined to be different from each other according to the characteristics of the camera 120 that captures an image. For example, values appropriate for adjusting a brightness of a light source according to cameras may be determined as the values.

In addition, a PV according to an embodiment of the disclosure may also be determined based on an exposure time from among exposure information of an image according to Equation 1 and Table 3 below. An exposure time

TABLE 3

| Range of Exposure Value (EV) | PV |
|---|---|
| 17-20 | 3 |
| 20-30 | 5 |
| 30-49 | 7 |
| 49-90 | 50 |
| 90-110 | 100 |
| 110-150 | 258 |
| 150-190 | 338 |
| 190-230 | 433 |
| 230-270 | 487 |
| 270-320 | 575 |
| 320-380 | 700 |
| 380-440 | 810 |
| 440-550 | 920 |
| 550-710 | 1275 |
| 710-900 | 1675 |
| 900-1050 | 1950 |
| 1050-1400 | 2550 |
| 1400-1800 | 3100 |
| 1800-2300 | 4454 |
| 2300-3000 | 4895 |
| >3000 | 20000 |

The maximum exposure time of Equation 1 denotes a maximum time that a shutter may be opened during image capturing and may be determined according to characteristics of a camera. In addition, (int) of Equation 1 denotes a function for converting a certain value to an integer value.

According to an embodiment of the disclosure, a brightness of a light source may be determined not only based on information about an exposure of an image described above, but also by further considering a luminance value of the image. For example, a value indicating a brightness of an ambient environment may be determined based on at least one of at least one luminance value of an image or information of an exposure of an image. A brightness value of an ambient environment according to an embodiment of the disclosure may be determined not only based on information about an exposure of an image and a luminance value of the image, but also other various types of information.

For example, a brightness value of a light source may be determined based on a luminance value and exposure information of an image according to Equation 2.

$$\text{Brightness of Light Source} = \{(Y\text{ value})*X*M_1\} + \{(PV)*Z*M_2\}$$  Equation 2

In Equation 2, a (Y value) may be determined based on a luminance value of at least one pixel included in an image captured according to an embodiment of the disclosure. For example, a (Y value) may be determined to be a representative value of luminance values of at least one pixel included in an image. A representative value of a luminance value may be determined based on, for example, at least one of an average value, an intermediate value, or a mode value of the luminance value.

A PV may denote a brightness value of an ambient environment that may be determined based on exposure information of an image described above. In addition, X and Z are respectively weight values applicable to a (Y value) and a PV, and may be set to different values according to a brightness of an ambient environment in which an image is captured. For example, a value of at least one of X or Z may be set to different values from each other based on whether a brightness of an ambient environment represented by a PV is equal to or greater than a reference value.

X and Z according to an embodiment of the disclosure may be determined as shown in Table 4. Unlike an X value, a Z value that is applicable to a PV may be set to a different value according to a PV. According to an embodiment of the disclosure, when a PV is equal to or greater than a reference value (e.g., 160), then, as shown in Table 4, (¼) may be determined as a Z value; when a PV is less than the reference value, (⅙) may be determined as a Z value.

X and Z values according to an embodiment of the disclosure may be determined experimentally through comparison with a brightness value of a light source determined based on an illuminance sensor shown in Table 4. For example, X and Z values may be determined such that a brightness value of a light source determined according to Equation 2 is equal to or similar to a brightness value of a light source determined based on an illuminance sensor.

TABLE 4

| Y value | PV | X | Z | Brightness of light source according to an embodiment of the disclosure | Brightness of light source based on illuminance sensor |
|---|---|---|---|---|---|
| 100 | 80 | (1/2) | (1/6) | 63 | 60 |
| 50 | 60 | (1/2) | (1/6) | 35 | 36 |
| 160 | 240 | (1/2) | (1/4) | 140 | 142 |
| 20 | 30 | (1/2) | (1/6) | 15 | 16 |
| 150 | 180 | (1/2) | (1/4) | 120 | 118 |

$M_1$ and $M_2$ are weight values that may be determined according to a record of user inputs for controlling a brightness of a light source. Values of $M_1$ and $M_2$ may be determined according to a user input and based on trained data such that a light source is controlled to have a brightness suitable for a user.

For example, a user who prefers a relatively bright display may frequently input user inputs to control a display to be brighter. Thus, according to an embodiment of the disclosure, based on a record of user inputs and trained data, also when a brightness of an ambient environment is equal to that of a display, $M_1$ and $M_2$ values may be determined such that the display is controlled to be brighter.

Figure 2:
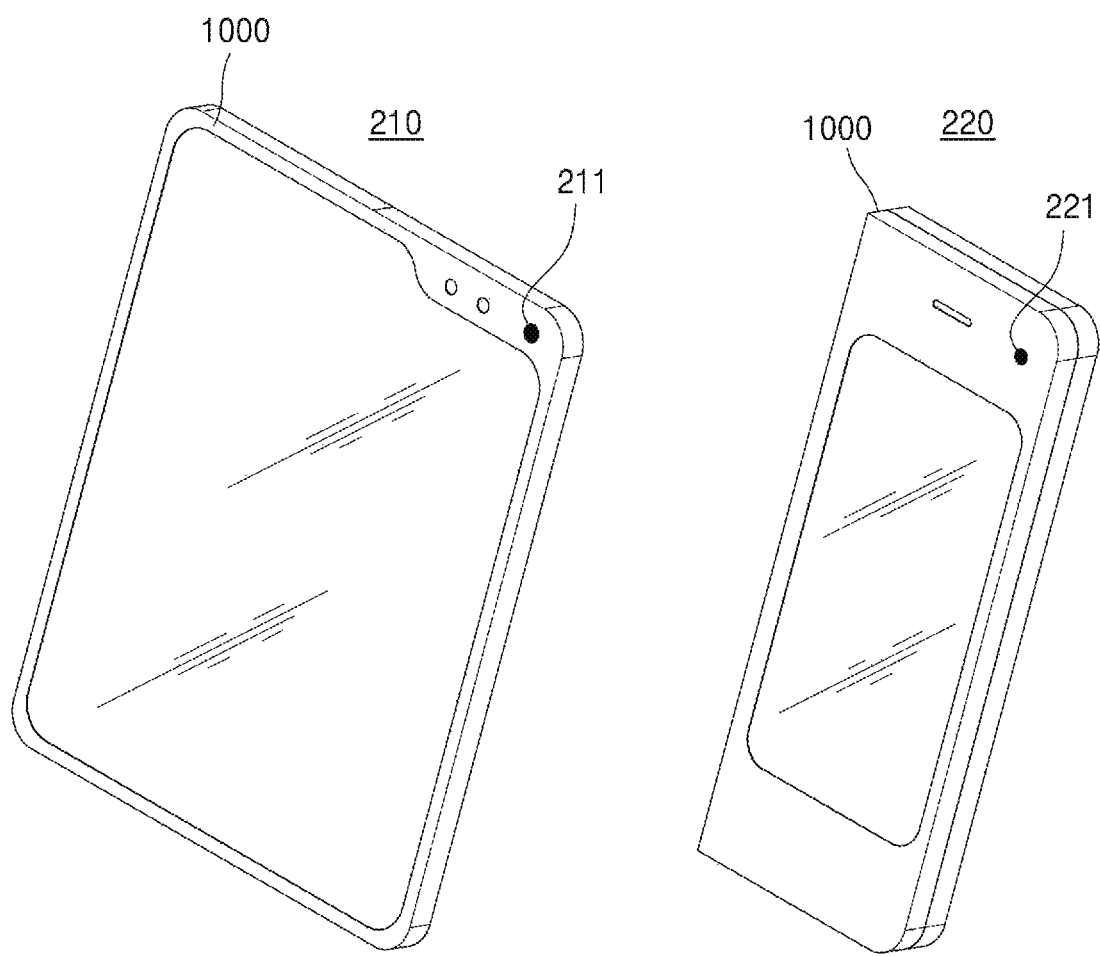
FIG. 2 illustrates an example of an electronic device for controlling a brightness of a light source, according to an embodiment of the disclosure.

FIG. 2 illustrates an example of an electronic device 1000 for controlling a brightness of a light source, according to an embodiment of the disclosure.

Referring to FIG. 2, the electronic device 1000 may be folded as in the illustrated example.

In an unfolding state 210 and a folding state 220 of the electronic device 1000 according to an embodiment of the disclosure, information about a brightness of an ambient environment may be determined using cameras 211 and 221 included in different portions of the electronic device 1000.

For example, in the unfolding state 210, information about a brightness of the ambient environment may be determined based on an image captured using the camera 211 which is in the vicinity of an unfolded display of the electronic device 1000. In addition, a brightness of the unfolded display may be controlled based on brightness information of the ambient environment determined according to an image captured using the camera 211.

In addition, in the folding state 220, information about a brightness of the ambient environment may be determined based on an image captured using the camera 221 which is in the vicinity of a folded display of the electronic device 1000. In addition, a brightness of the folded display may be controlled based on brightness information of the ambient environment determined according to an image captured using the camera 221.

Accordingly, the electronic device 1000 according to an embodiment of the disclosure may control a brightness of a display by using a camera that is in the vicinity of the display and is mainly used according to a folding state of the electronic device 1000. The electronic device 1000 according to an embodiment of the disclosure may determine information about a brightness of the ambient environment just by using the cameras 211 and 221 without including a plurality of illuminance sensors for determining information about a brightness of the ambient environment. Accordingly, according to an embodiment of the disclosure, advantageous effects in terms of cost reduction and simple design may be provided.

Figure 3:
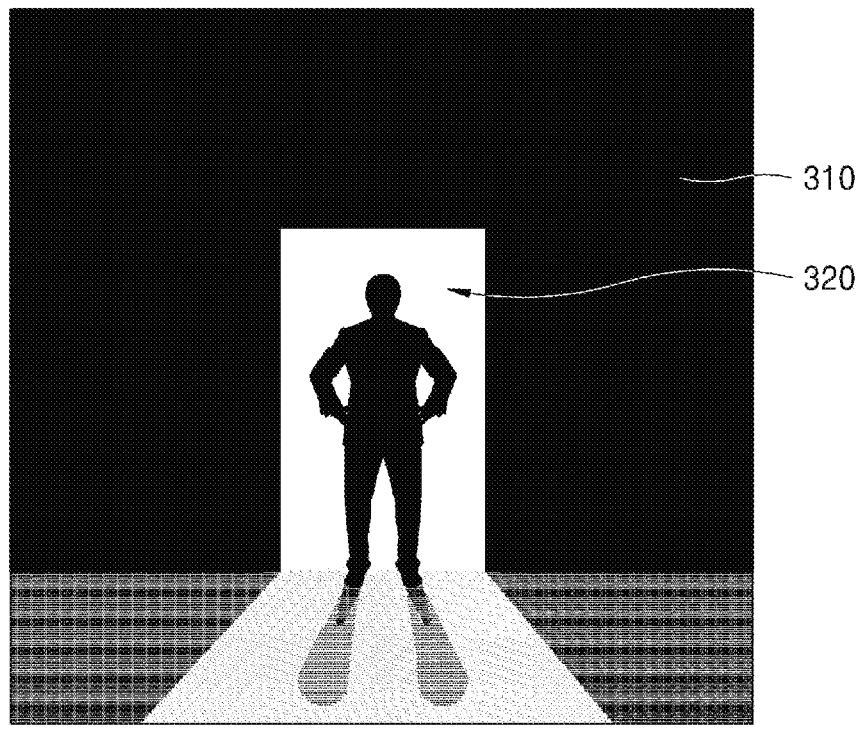
FIG. 3 illustrates an example of a brightness of an ambient environment of an electronic device, according to an embodiment of the disclosure.

FIG. 3 illustrates an example of a brightness of an ambient environment of the electronic device 1000, according to an embodiment of the disclosure.

The electronic device 1000 according to an embodiment of the disclosure may include a plurality of cameras and may capture at least one image by using, from among the plurality of cameras, at least one camera capable of capturing an image of an ambient environment of a light source, a brightness of which is to be adjusted, and may determine information about a brightness of the ambient environment based on the captured image.

While a user of the electronic device 1000 is standing behind light as illustrated in FIG. 3, when the user is looking at the electronic device 1000, the electronic device 1000 may include a first camera capturing an image of an ambient environment 320 behind the user and a second camera capturing an image of an ambient environment 310 in front of the user.

According to an embodiment of the disclosure, the electronic device 1000 may identify, from among the first camera and the second camera, a camera that is capable of capturing an image of an ambient environment of a light source, a brightness of which is to be controlled.

For example, when a user is looking at the electronic device 1000, the electronic device 1000 may identify a camera to capture an image to control a brightness of a display facing the user. In the above example, when the display of the electronic device 1000 faces the ambient environment 320 behind the user, user experience of the user viewing the display may vary according to a brightness of the ambient environment 320 behind the user.

For example, when a brightness of the ambient environment 320 is too bright compared to the display, the user may have difficulty in properly determining details displayed on the display. When the brightness of the ambient environment 320 is too dark compared to the display, the user may experience glare due to the brightness of the display.

Accordingly, the electronic device 1000 may capture an image by using the first camera capturing an image of the ambient environment 320 behind the user from among the plurality of cameras, and determine information about a brightness of the ambient environment based on the captured image. The electronic device 1000 may control a brightness of the display facing the user and the ambient environment 320 behind the user based on the determined information about a brightness of the ambient environment.

Accordingly, as the electronic device 1000 according to an embodiment of the disclosure is capable of controlling a brightness of a display by using at least one camera without using an illuminance sensor, better experience may be provided to a user who watches the display.

Figure 4:
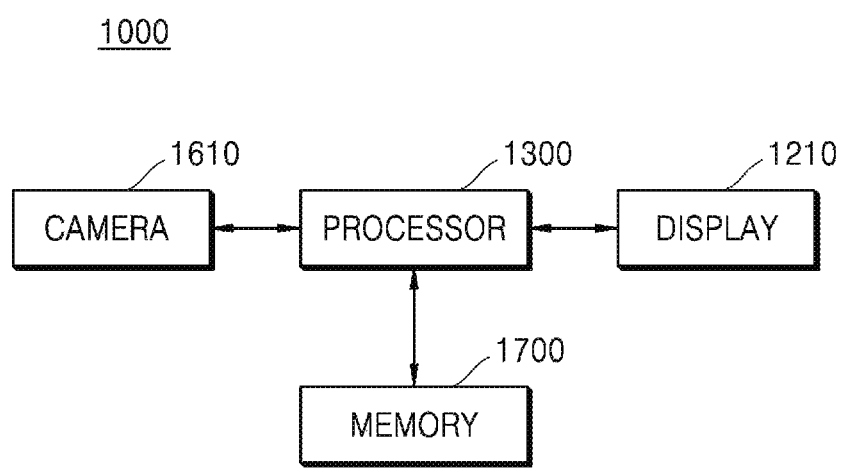
FIG. 4 is a block diagram illustrating internal components of an electronic device according to an embodiment of the disclosure.

FIG. 4 is a block diagram illustrating internal components of the electronic device 100 according to an embodiment of the disclosure.

Figure 5:
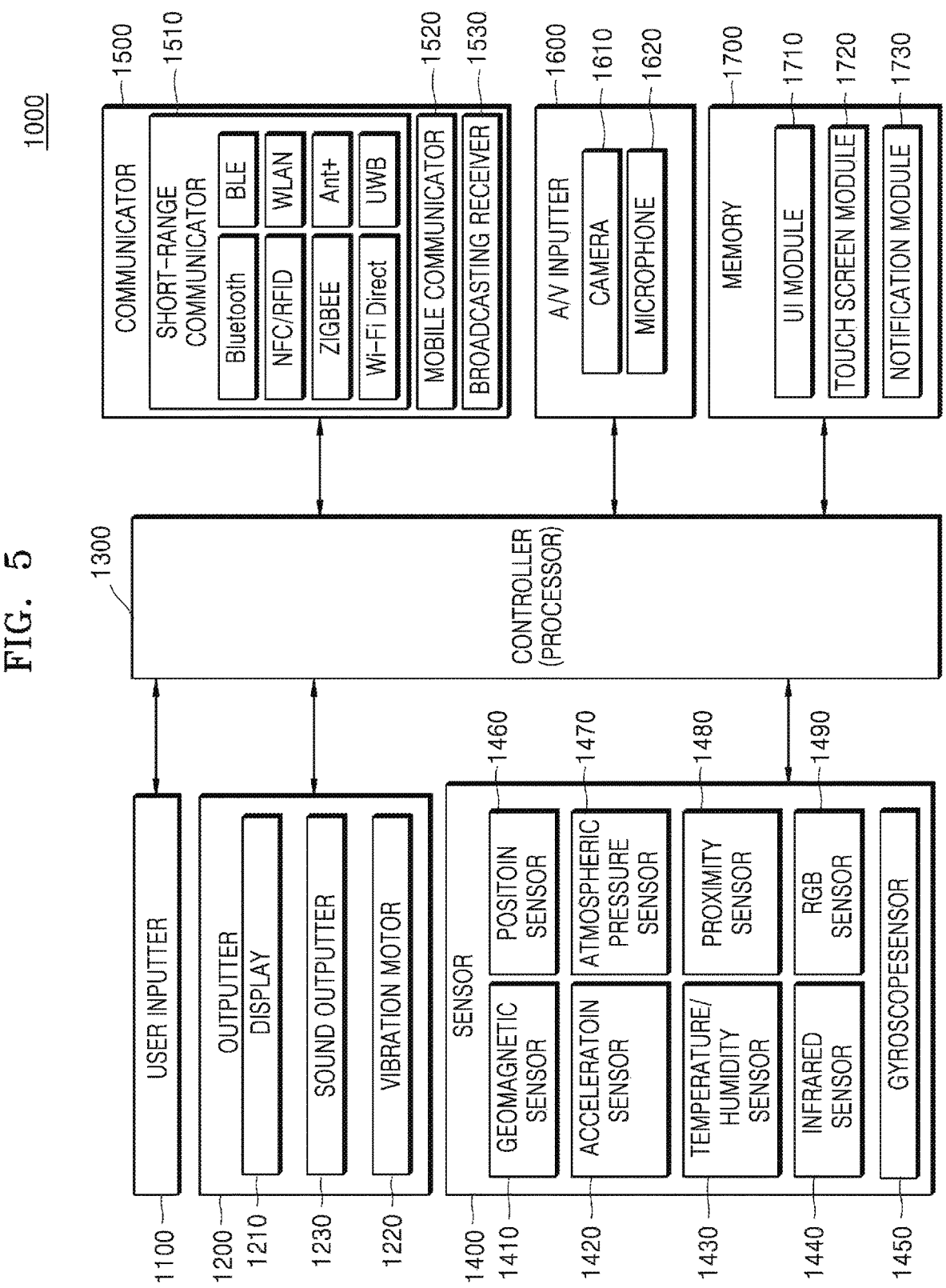
FIG. 5 is a block diagram illustrating internal components of an electronic device according to an embodiment of the disclosure.

FIG. 5 is a block diagram illustrating internal components of the electronic device 1000 according to an embodiment of the disclosure.

Referring to FIG. 4, the electronic device 1000 may include a camera 1610, a processor 1300, a memory 1700, and a display 1210. However, not all of the components shown in FIG. 4 are essential components of the electronic device 1000. The electronic device 1000 may be implemented using more components than the components shown in FIG. 4 or using fewer components than those shown in FIG. 4.

Referring to FIG. 5, the electronic device 1000 according to some embodiments of the disclosure may further include a user inputter 1100, an outputter 1200, a sensor 1400, a communicator 1500, and an audio/video (A/V) inputter 1600 in addition to the camera 1610, the processor 1300, the memory 1700, and the display 1210.

The user inputter 1100 refers to a component allowing a user to input data for controlling the electronic device 1000. For example, the user inputter 1100 may include a keypad, a dome switch, a touchpad (e.g., a touch capacitive type touch pad, a pressure resistive type touch pad, an infrared beam sensing type touch pad, a surface ultrasonic wave conduction type touch pad, an integral strain gauge type touch pad, a piezo-effect type touch pad, etc.), a jog wheel, a jog switch, and the like, but is not limited thereto.

According to an embodiment of the disclosure, the user inputter 1100 may receive a user input for controlling a brightness of a light source.

The outputter 1200 may output an audio signal, a video signal or a vibration signal, and the outputter 1200 may include the display 1210, a sound outputter 1230, and a vibration motor 1220.

The display 1210 outputs and displays information processed using the electronic device 1000. The display 1210 according to an embodiment of the disclosure may output a result of a brightness of a light source adjusted according to an embodiment of the disclosure. In addition, a brightness of the display 1210 may be controlled based on information about a brightness of an ambient environment determined according to an according to an embodiment of the disclosure.

When the display 1210 and a touch pad are in a layered structure to form a touch screen, the display 1210 may also be used as an input device as well as an output device. The display 1210 may include at least one of a liquid crystal display, a thin film transistor-liquid crystal display, an organic light-emitting diode display, a flexible display, a three-dimensional (3D) display, or an electrophorectic display. The electronic device 1000 may include two or more displays 1210 according to an implementation form of the electronic device 1000.

The sound outputter 1230 outputs audio data received from the communicator 1500 or stored in the memory 1700.

The vibration motor 1220 may output a vibration signal. In addition, the vibration motor 1220 may output a vibration signal when a touch is input to a touch screen.

The processor 1300 typically controls an overall operation of the electronic device 1000. For example, the processor 1300 may control overall operation of the user inputter 1100, the outputter 1200, the sensor 1400, the communicator 1500, and the A/V inputter 1600 by executing programs stored in the memory 1700. The electronic device 1000 may include at least one processor 1300.

The processor 1300 may be configured to process commands of a computer program by performing basic arithmetic, logic and input/output operations. A command may be provided from the memory 1700 to the processor 1300 or received from the communicator 1500 and provided to the processor 1300. For example, the processor 1300 may be configured to execute a command according to a program code stored in a recording device such as a memory.

The at least one processor 1300 according to an embodiment of the disclosure may determine a brightness of an ambient environment based on a captured image of the ambient environment and control a brightness of a light source based on the determined brightness of the ambient environment. Examples of a light source that may be controlled according to an embodiment of the disclosure may include the display 1210 of the electronic device 1000, an external illumination, a display of an external device, or the like.

The sensor 1400 may sense a state of the electronic device 1000 or a state of the surroundings of the electronic device 1000 and transfer the sensed information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor 1460 (for example, a global positioning system (GPS)), an atmospheric pressure sensor 1470, a proximity sensor 1480, or a red-green-blue (RGB) sensor 1490 (e.g., an illuminance sensor), but is not limited thereto.

The communicator 1500 may include one or more components that allow the electronic device 1000 to communicate with a server (not shown) or an external device (not shown). For example, the communicator 1500 may include a short-range wireless communicator 1510, a mobile communicator 1520, and a broadcasting receiver 1530.

The communicator 1500 according to an embodiment of the disclosure may receive, from the outside, a message including a request for controlling a brightness of a light source present outside. In addition, the communicator 1500 may transmit a message for controlling a brightness of an external light source to the outside based on a brightness of an ambient environment, in response to the received message.

The short-range wireless communicator 1510 may include a Bluetooth communicator, a Bluetooth Low Energy (BLE) communicator, a near field communicator, a WLAN (WiFi) communicator, a Zigbee communicator, an infrared data association (IrDA) communicator, a Wi-Fi Direct (WFD) communicator, a ultra-wideband (UWB) communicator, and an Ant+ communicator, but is not limited thereto.

The mobile communicator 1520 may transmit or receive a wireless signal to or from at least one of a base station on a mobile communication network, an external terminal, or a server. A wireless signal may include a voice call signal, a video telephony call signal or various types of data according to transmission or reception of text and multimedia messages.

The broadcasting receiver 1530 receives a broadcasting signal and/or information related to broadcasting from the outside via a broadcasting channel. The broadcasting channel may include a satellite channel or a terrestrial channel. According to an embodiment of the disclosure, the electronic device 1000 may not include the broadcasting receiver 1530.

The A/V inputter 1600 is used to input an audio signal or a video signal and may include the camera 1610 and a microphone 1620. The camera 1610 may receive an image frame such as a still image or a moving image by using an image sensor in a video call mode or a photographing mode. An image captured using an image sensor may be processed using the processor 1300 or an additional image processor (not shown). The microphone 1620 receives an external sound signal and processes the same to electrical voice data.

By using the camera 1610 according to an embodiment of the disclosure, an image including an ambient environment of a light source to be controlled may be captured. A brightness of a light source may be controlled according to an embodiment of the disclosure, based on the captured image.

The memory 1700 may store a program for processing or controlling the processor 1300 and store data input to the electronic device 1000 or output from the electronic device 1000.

The memory 1700 according to an embodiment of the disclosure may store one or more instructions, and the at least one processor 1300 of the electronic device 1000 described above may execute the at one or more instructions to perform an operation according to an embodiment of the disclosure.

In addition, the memory 1700 according to an embodiment of the disclosure may store information needed to control a brightness of a light source according to an embodiment of the disclosure. For example, the memory 1700 may store data about an image captured using the camera 1610.

The memory 1700 may include at least one type of storage medium selected from a flash memory type storage medium, a hard disk type storage medium, a multimedia card micro type storage medium, a card type memory (e.g., SD or XD memory), a random access memory (RANI), a static random access memory (SRAM), a read-only memory (ROM), an electrically erasable programmable read-only memory (EEPROM), a programmable read-only memory (PROM), a magnetic memory, a magnetic disc, or an optical disc.

Programs stored in the memory 1700 may be classified into a plurality of modules according to their respective functions, for example, into a user interface (UI) module 1710, a touch screen module 1720, a notification module 1730, or the like.

The UI module 1710 may provide a specialized UI or a graphical user interface (GUI) that are linked to the electronic device 1000 according to applications. The touch screen module 1720 may sense a touch gesture on a touch screen of a user and transfer information about the touch gesture to the processor 1300. The touch screen module 1720 according to some embodiments of the disclosure may recognize and analyze a touch code. The touch screen module 1720 may be configured as an additional hardware component including a controller.

Various sensors may be included inside or near a touch screen to sense a touch or a proximity touch of the touch screen. An example of a sensor for sensing a touch of a touch screen is a tactile sensor. A tactile sensor refers to a sensor that detects a contact of a certain object with a degree or more that is perceivable by a person. A tactile sensor may sense various types of information such as roughness of a contact surface, rigidity of a contact object, a temperature of a point of contact, or the like.

Examples of a touch gesture of a user may include a tap, a touch & hold, a double tap, a drag, a panning, a flicking, a drag and drop, and a swipe.

The notification module 1730 may generate a signal for notifying occurrence of an event of the electronic device 1000.

Figure 6:
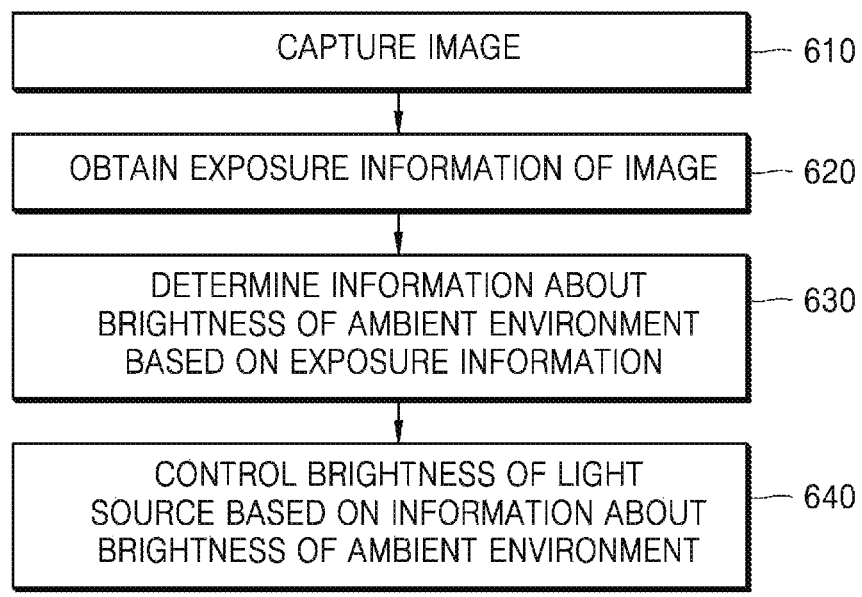
FIG. 6 is a flowchart of a method of controlling a brightness of a light source, according to an embodiment of the disclosure.

FIG. 6 is a flowchart of a method of controlling a brightness of a light source, according to an embodiment of the disclosure.

Referring to FIG. 6, in operation 610, the electronic device 1000 may capture an image including an ambient environment of a light source to be controlled. The electronic device 1000 according to an embodiment of the disclosure may periodically capture an image including an image of an ambient environment, and periodically control a brightness of the light source based on the information about a brightness of the ambient environment determined based on the captured image.

For example, when a light source controlled by the electronic device 1000 is a display included in the electronic device 1000, a brightness of the display may be controlled based on an image captured using a camera capable of capturing an image of the ambient environment faced by the display.

As another example, when a light source controlled by the electronic device 1000 is an external illumination device, a brightness of the light source may be controlled based on an image captured using a camera capable of capturing an image of an ambient environment around the external illumination device.

In operation 620, the electronic device 1000 may obtain exposure information of the image captured in operation 610. An image captured using the electronic device 1000 according to an embodiment of the disclosure may be automatically captured without a user's request, and an image may be captured based on exposure information that is automatically set to enable photographing of a high-quality image. When an image is captured according to an embodiment of the disclosure, information about an exposure of the captured image may include the automatically set exposure information described above.

In operation 630, the electronic device 1000 may determine information about a brightness of an ambient environment of a light source, a brightness of which is to be controlled, based on the exposure information of the image captured using a camera. Exposure information of an image according to an embodiment of the disclosure may be automatically set based on a brightness of an image, which varies according to a brightness of an ambient environment. Accordingly, the electronic device 1000 may determine information about a brightness of the ambient environment based on the exposure information of the image.

In operation 640, the electronic device 1000 may control a brightness of a light source based on the information about the brightness of the ambient environment determined in operation 630.

Figure 7:
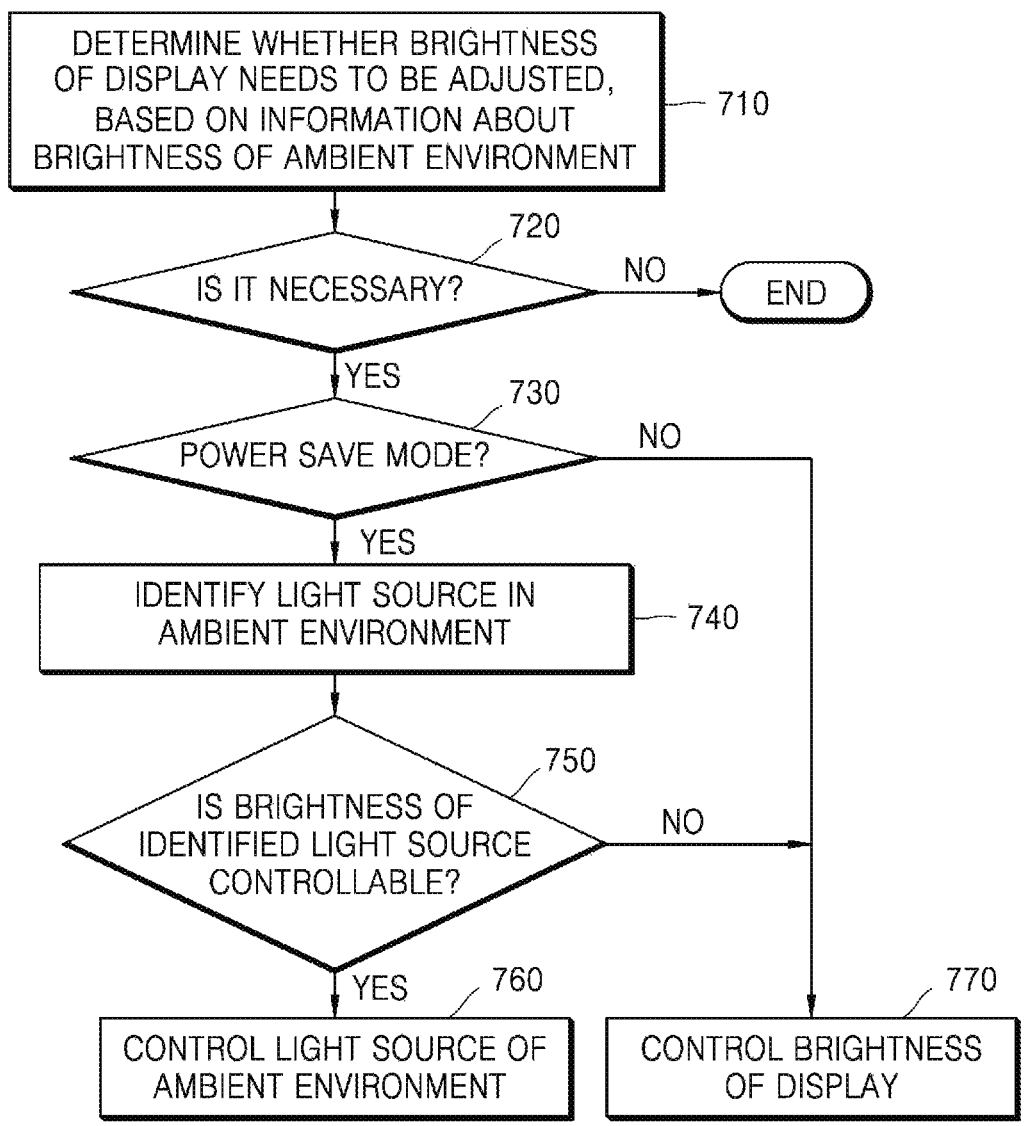
FIG. 7 is a flowchart of a method of controlling a brightness of a display, according to an embodiment of the disclosure.

FIG. 7 is a flowchart of a method of controlling a brightness of a display, according to an embodiment of the disclosure.

Referring to FIG. 7, the method of controlling a brightness of a display, a brightness of a display of the electronic device 1000 or a brightness of an external light source instead of the display may be controlled based on information about a brightness of an ambient environment. In addition, according to an embodiment of the disclosure, based on whether a display is operated in a power save mode or not, a brightness of a light source in the ambient environment or a brightness of the display of the electronic device 1000 may be controlled.

A display, a brightness of which may be controlled according to an embodiment of the disclosure, may be included in the electronic device 1000, but is not limited thereto and may also be outside the electronic device 1000.

Referring to FIG. 7, in operation 710, the electronic device 1000 may determine whether a brightness of the display of the electronic device 1000 needs to be adjusted, based on information about a brightness of the ambient environment determined based on an image captured according to an embodiment of the disclosure. According to an embodiment of the disclosure, a captured image may be an image including an ambient environment of the display.

For example, it may be determined based on information about a brightness of an ambient environment that a current brightness of the display is appropriate and thus does not need to be adjusted.

In addition, according to an embodiment of the disclosure, whether a brightness of the display is to be adjusted or not may be determined based on an arrangement of the electronic device 1000. The determining the need to adjust a brightness of the display may be performed before capturing an image, and an operation of capturing an image of an ambient environment may be performed according to a result of the determining. For example, when the electronic device 1000 is inside a pocket and the display of the electronic device 1000 is facing an opaque object (for example, a desk, an upper side of a table), it may be determined that there is no need to adjust a brightness of the display.

On the other hand, it may be determined that a current brightness of the display is not appropriate based on the information about a brightness of the ambient environment and thus needs to be adjusted.

In addition, according to an embodiment of the disclosure, when controlling a brightness of the display to be dark based on the information about a brightness of the ambient environment, the electronic device 1000 does not have to control a brightness of a light source or a brightness of the ambient environment by considering whether the display is in a power save mode or not. This is because when the brightness of the display is controlled to be dark, energy consumption of the display is further reduced. Accordingly, when the electronic device 1000 controls the brightness of the display to be dark based on the information about a brightness of the ambient environment, the electronic device 1000 may control the brightness of the display to be dark according to the information about a brightness of the ambient environment without determining a light source of the ambient environment according to operations from operation 720.

In operation 720, when it is determined that the brightness of the display does not need to be adjusted, the electronic device 1000 may end an operation of controlling a brightness of a light source according to an embodiment of the disclosure.

In operation 730, the electronic device 1000 may determine whether a light source to be controlled operates currently in a power save mode. For example, when a light source, a brightness of which is to be controlled according to an embodiment of the disclosure, is a display of the electronic device 1000, the display may operate in a power save mode as a remaining battery power of the electronic device 1000 is equal to or less than a reference value.

According to an embodiment of the disclosure, in operation 730, when the display does not operate in a power save mode, the electronic device 1000 may control the brightness of the display to be brighter according to the brightness of the ambient environment in operation 770.

On the other hand, when the display operates in a power save mode, in operation 740, the electronic device 1000 may identify a light source present in the ambient environment of the display. For example, the electronic device 1000 may search for at least one illumination device present around the display. For example, when the display is located in a living room of a house, the electronic device 1000 may search for at least one illumination device present in the living room.

In operation 750, the electronic device 1000 may determine whether a brightness of the light source identified in operation 740 is controllable. For example, the electronic device 1000 may determine whether a brightness of the identified light source may be controlled by determining whether data may be transmitted to or received from the light source identified in operation 740 or whether the electronic device 1000 has a right to control the light source.

In operation 760, when a brightness of the light source identified in operation 740 may be controlled, the electronic device 1000 may control a brightness of at least one identified light source to be dark such that a brightness of the ambient environment of the display becomes dark. When the brightness of the ambient environment is dark as the brightness of the light source in the ambient environment becomes dark, even when the brightness of the display is not controlled to be bright, a user may view the display without inconvenience. Thus, according to an embodiment of the disclosure, instead of controlling a brightness of the display to be bright, the brightness of the ambient environment is controlled to be dark, and thus, battery consumption of the display operating in a power save mode may be reduced.

On the other hand, when a brightness of a light source identified to be in the ambient environment of the display is not controllable, the electronic device 1000 may control a brightness of the display to be bright according to the information about a brightness of the ambient environment.

For example, when the display is under natural light, the electronic device 1000 cannot control natural light, and thus, the electronic device 1000 may control a brightness of the display, instead of that of a light source, in operation 770. As another example, when the electronic device 1000 has no right to control an identified light source or cannot transfer a control request to the light source, in operation 770, the electronic device 1000 may control a brightness of the display instead of that of the light source.

FIG. 8 illustrates an example in which a brightness of a light source is controlled based on a brightness of an ambient environment, according to an embodiment of the disclosure.

Referring to FIG. 8, examples 810 and 820 respectively illustrate examples in which a brightness of a light source (e.g., a display) is determined according to an illuminance sensor and a brightness of the ambient environment measured using an image, respectively. In 810 and 820, line A denotes a brightness of a light source determined using an illuminance sensor, and line B denotes a brightness of a light source determined using a captured image of the ambient environment.

Line B illustrated in 810 indicates a case where a brightness of an ambient environment is determined based on luminance values of an image without considering information about an exposure of the image, according to an embodiment of the disclosure, and a brightness of a light source is determined according to the determined brightness of the ambient environment.

Unlike in 810, line B illustrated in 820 indicates a case where a brightness of an ambient environment is determined based on information about an exposure of an image, according to an embodiment of the disclosure, and a brightness of a light source is determined according to the determined brightness of the ambient environment.

Like 810, when the electronic device 1000 determines a brightness of the ambient environment based on luminance values of an image, the luminance values of the image may also be determined not only according to the brightness of the ambient environment but also according to other factors such as a color of a subject included in the image. Accordingly, a distribution of luminance values of an image may not be uniform according to the brightness of the ambient environment. In addition, as shown in 810, a brightness of a light source may not be uniform as the brightness of the ambient environment increases.

However, as in 820, when information about an exposure of an image is further considered without being limited to luminance values of the image, a brightness of a light source may be determined at a higher accuracy than when determining a brightness of a light source by considering only luminance values of an image.

Figure 9:
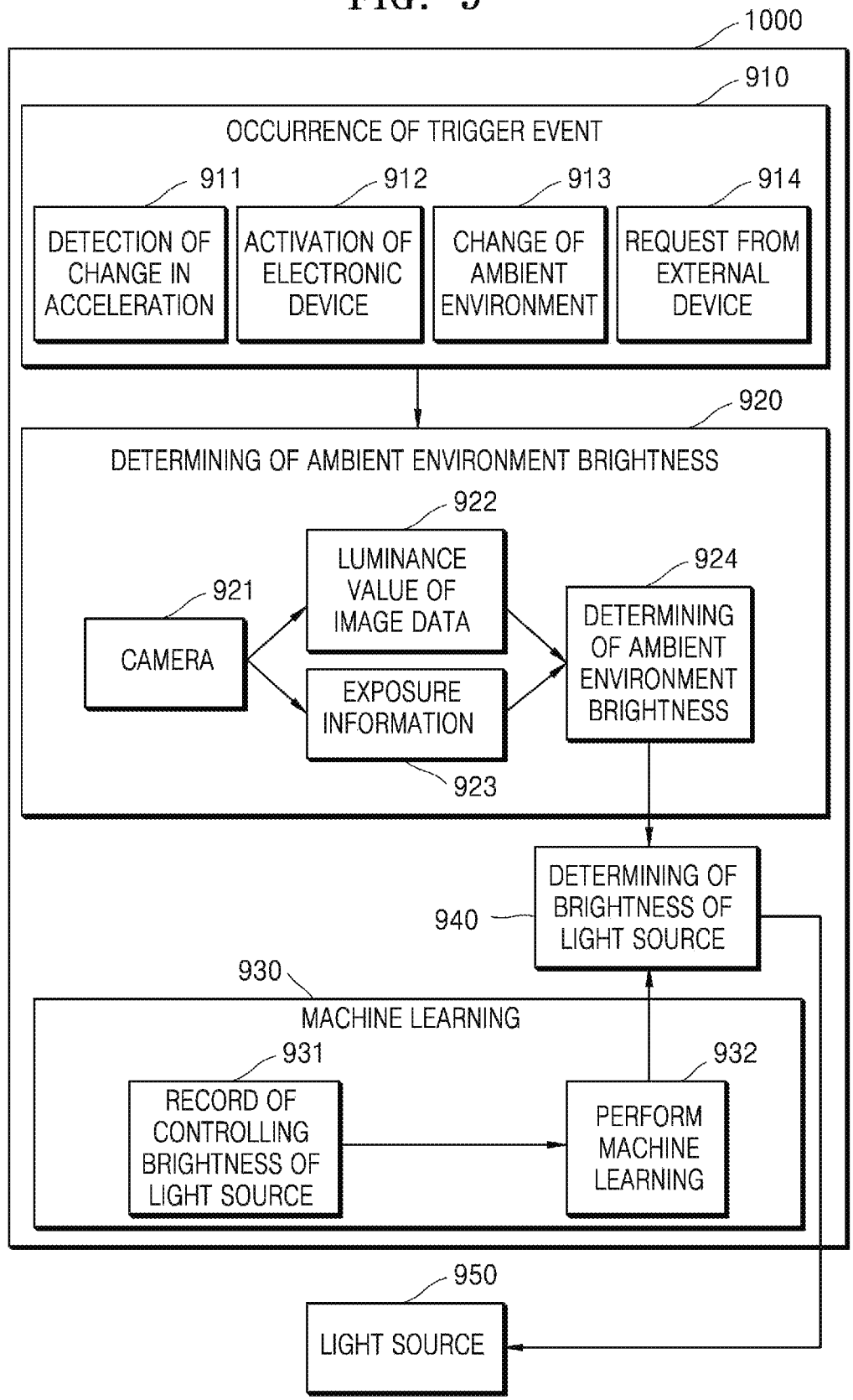
FIG. 9 illustrates an example in which a light source is controlled by using an electronic device, according to an embodiment of the disclosure.

FIG. 9 illustrates an example in which a light source is controlled by using an electronic device 1000, according to an embodiment of the disclosure.

Referring to FIG. 9, as a trigger event is generated (910), the electronic device 1000 may determine information about a brightness of an ambient environment, according to an embodiment of the disclosure (920), and control a light source 950 according to the information about a brightness of the ambient environment.

The light source 950 that may be controlled according to an embodiment of the disclosure may include a display included in the electronic device 1000 or a light source of another electronic device 1000 present around the electronic device 1000.

A trigger event that may be generated in the electronic device 1000 according to an embodiment of the disclosure may include at least one of detection of a change in acceleration (911), electronic device activation (912), a change of an ambient environment (913), or a request from an external device (914).

For example, when a user holds the electronic device 1000 in the hand to use the electronic device 1000, an abrupt change in acceleration may be detected (911). According to an embodiment of the disclosure, when an abrupt change in acceleration is detected (911) in the electronic device 1000, as the use of the electronic device 1000 by the user is expected, an operation of the electronic device 1000 controlling a brightness of a light source (e.g., a display) may be started.

In addition, when a lock screen of the electronic device 1000 is released to activate the electronic device 1000 (912), as the use of the electronic device 1000 by the user is expected, an operation of the electronic device 1000 controlling a brightness of a light source (e.g., a display) according to an embodiment of the disclosure may be started.

Also, when the ambient environment of the electronic device 1000 changes (913), for example, when weather changes or a position of the electronic device 1000 is changed from outdoors to indoors, an operation of the electronic device 1000 controlling a brightness of a light source (e.g., a display) according to an embodiment of the disclosure may be started according to the changed ambient environment.

Also, as a request from an external device is received (914), an operation of controlling a brightness of a light source of an external device or the ambient environment may be started. For example, when a request for controlling a brightness of an external light source is received by the electronic device 1000, the electronic device 1000 may determine information about a brightness of an ambient environment of the external light source and control the brightness of the external light source based on the determined information, according to an embodiment of the disclosure.

However, the disclosure is not limited to the above example, and the electronic device 1000 may start an operation of controlling a brightness of a light source according to an embodiment of the disclosure, upon the occurrence of various types of trigger events.

According to an embodiment of the disclosure, in an operation of determining a brightness of an ambient environment (920), the electronic device 1000 may obtain a captured image of the ambient environment, by using a camera 921. In addition, at least one of a luminance value 922 of image data or exposure information 923 may be obtained based on the captured image. According to an embodiment of the disclosure, the electronic device 1000 may determine a brightness of an ambient environment (924) based on at least one of the luminance value 922 of image data or the exposure information 923.

According to an embodiment of the disclosure, the electronic device 1000 may further perform a machine learning operation 930 based on a light source adjustment record 931. According to an embodiment of the disclosure, a brightness of a light source may be determined (940) according to the brightness of the ambient environment based on a result of machine learning (932).

For example, a brightness of a light source may be determined (940) based on data obtained by training based on the light source adjustment record according to a user. The trained data may include various types of artificial intelligence models that are trained based on records including light source brightness that is adjusted differently according to users.

The electronic device 1000 according to an embodiment of the disclosure may control a brightness value of the light source according to a brightness of the light source that is determined (940) based on a result of machine learning (932) and a brightness value of an ambient environment (924).

Figure 10:
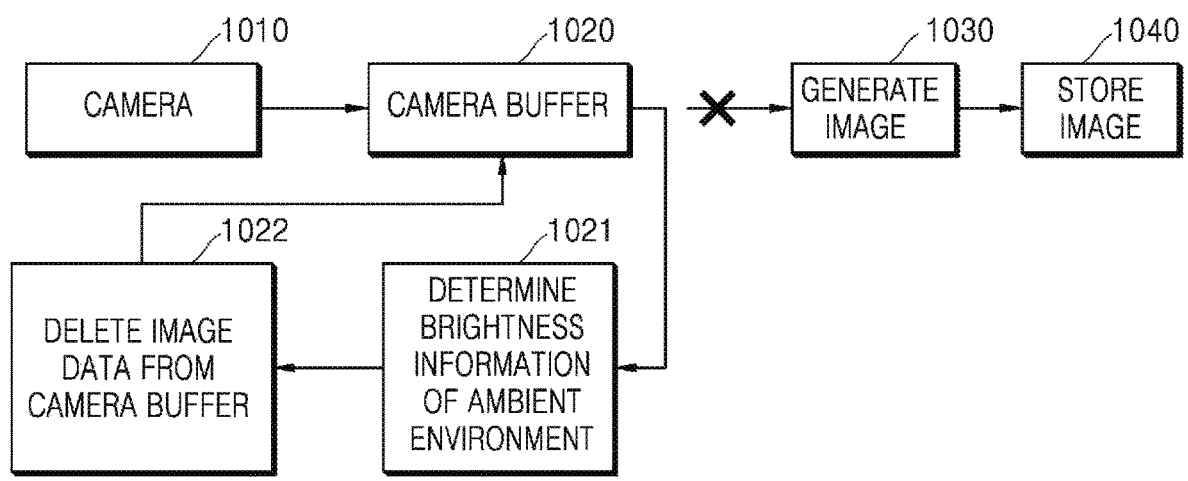
FIG. 10 illustrates an example of controlling a light source, according to an embodiment of the disclosure.

FIG. 10 illustrates an example of controlling a light source, according to an embodiment of the disclosure.

Referring to FIG. 10, a camera 1010 of an electronic device 1000 may capture an image and store data about the captured image in a camera buffer 1020.

The camera buffer 1020 according to an embodiment of the disclosure may be a memory for temporarily storing data about images captured using the camera 1010 during an image capturing operation.

Image data of images captured according to a user input, which is not an image captured to control a light source according to an embodiment of the disclosure, is stored in the camera buffer 1020, and an image may be generated (1030) and stored (1040) according to the data about the image stored in the camera buffer 1020. For example, when image capturing is performed by the camera 1010 according to a user input, data about a captured image is stored in the camera buffer 1020, and an image may be generated (1030) and stored (1040) according to the data about the image stored in the camera buffer 1020.

However, data about an image captured to control a light source, according to an embodiment of the disclosure, may be used only in obtaining information about a brightness of an ambient environment.

Data about an image captured according to an embodiment of the disclosure may be stored in the camera buffer 1020 and used in determining information about a brightness of an ambient environment of a light source (1021) and deleted from the camera buffer 1020 (1022). A brightness of a light source may be controlled based on the determined information about a brightness of the ambient environment, according to an embodiment of the disclosure.

Accordingly, according to an embodiment of the disclosure, an image captured to control a brightness of a light source is used only in determining ambient environment brightness information to control a brightness of a light source in the camera buffer 1020, and is not generated or stored as another image, and thus, leakage of an image that may include sensitive information of a user may be prevented.

Figure 11:
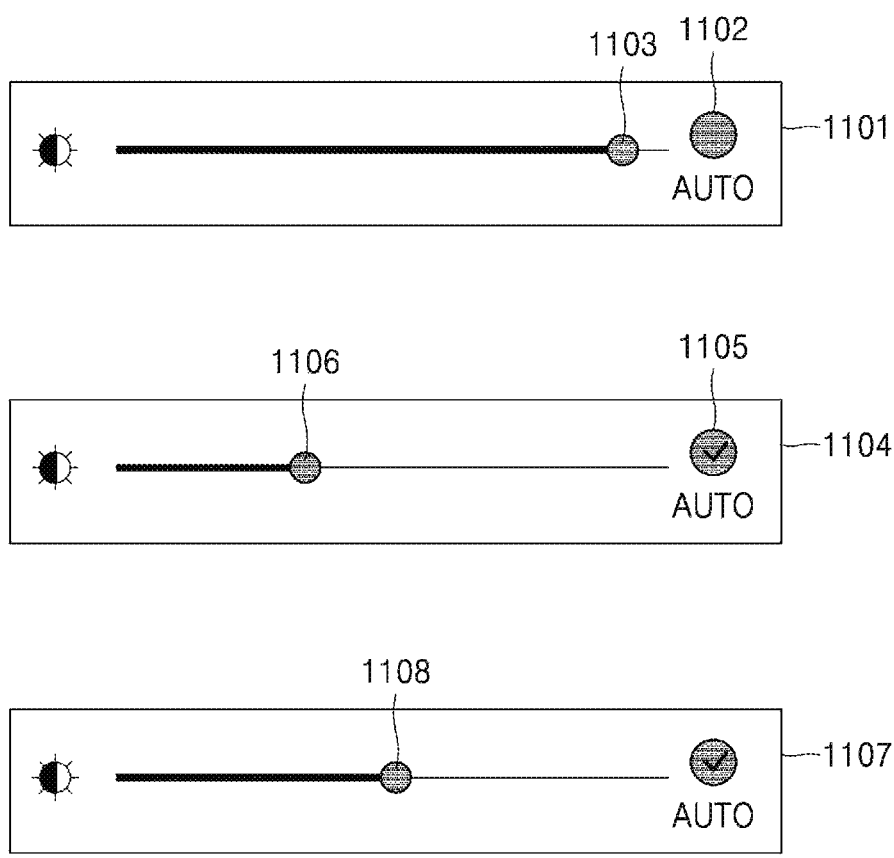
FIG. 11 illustrates an example in which a brightness of a light source is controlled by a user, according to an embodiment of the disclosure.

FIG. 11 illustrates an example in which a brightness of a light source is controlled by a user, according to an embodiment of the disclosure.

Referring to FIG. 11, in 1101, a brightness of a light source (e.g., a display) may be controlled according to a user input regardless of a brightness of an ambient environment. For example, a brightness of a light source may be controlled according to a user input that moves a button 1103 displayed on a display.

In 1104, when an auto-button 1105 is activated to automatically control a brightness of a light source according to an ambient environment brightness, the button 1106 displayed on the display may be automatically moved according to the ambient environment brightness, thereby controlling the brightness of the light source. For example, when the auto-button 1105 is activated according to a user input, an ambient environment brightness value may be determined automatically based on a captured image of the ambient environment, and a brightness of the light source may be controlled according to the ambient environment brightness value.

In 1107, a brightness of a light source may be controlled differently from the example of 1104, based on a record of controlling a brightness of a light source by a user. According to an embodiment of the disclosure, a button 1108 displayed on the display may be moved based on a record of controlling a brightness of a light source according to a user input. For example, when it is determined that a user prefers a light source of a higher brightness based on a training result based on a record of controlling a brightness of a light source, the brightness of the light source may be controlled to be brighter than the example of 1104.

Figure 12:
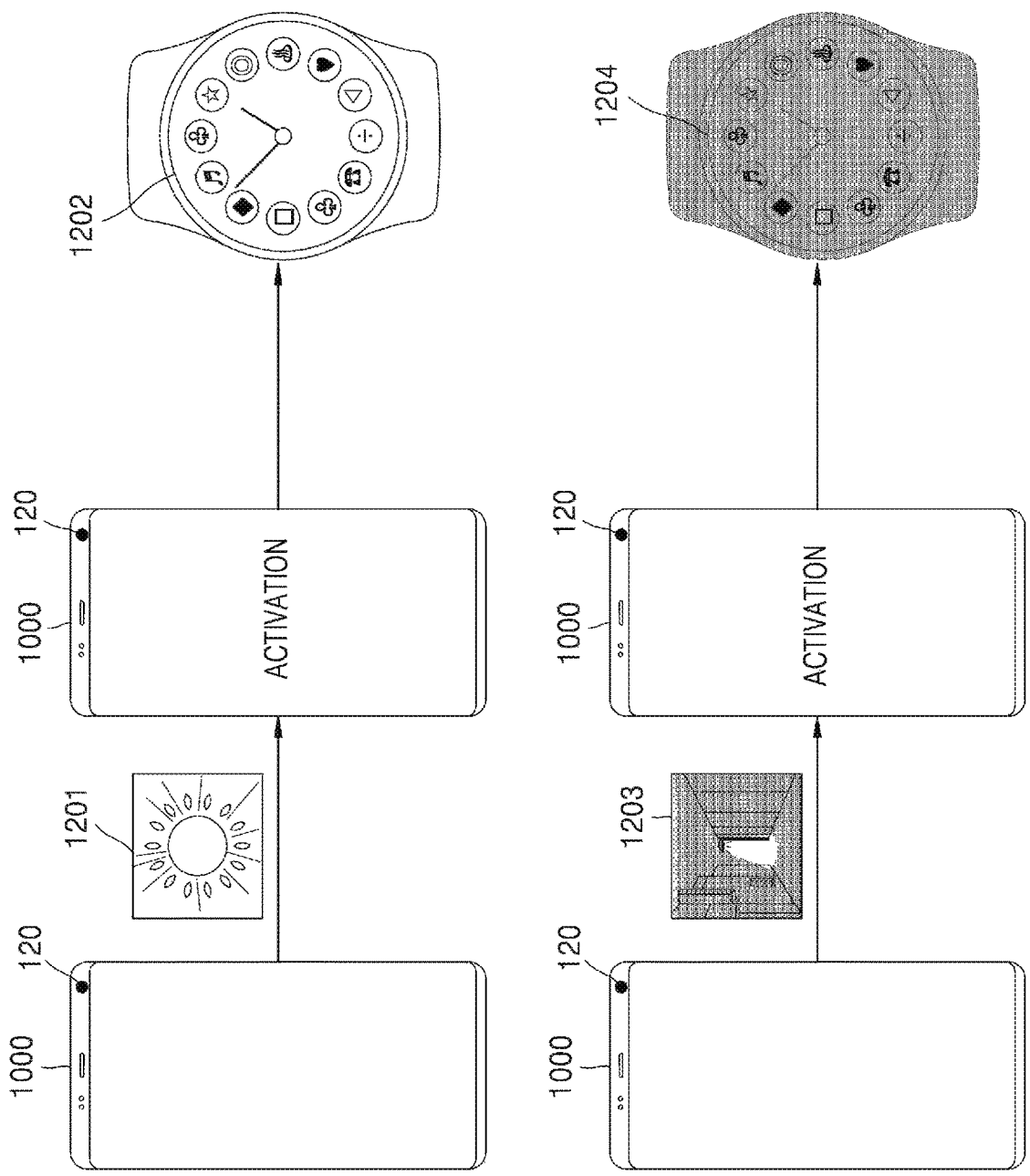
FIG. 12 illustrates an example of controlling a light source of an external device, according to an embodiment of the disclosure.

FIG. 12 illustrates an example of controlling a light source of an external device, according to an embodiment of the disclosure.

Referring to FIG. 12, the electronic device 1000 may determine a brightness value of an ambient environment based on a captured image of the ambient environment is captured using a camera 120. According to an embodiment of the disclosure, as a trigger event (e.g., activation of an electronic device) is generated, information about a brightness of the ambient environment may be determined, and an operation of controlling a brightness of a light source (e.g., a display) of the electronic device 1000 may be performed. For example, as a lock screen of the electronic device 1000 is released, a brightness of the light source of the electronic device 1000 may be controlled.

According to an embodiment of the disclosure, when the ambient environment of the electronic device 1000 is outdoors where the sun is blazing down, a display of the electronic device 1000 may be adjusted to be bright according to information about a brightness of the ambient environment determined based on a captured image 1201 of the ambient environment.

In addition, as the brightness of the light source is controlled, the electronic device 1000 according to an embodiment of the disclosure may identify at least one external light source 1202 which is controllable by the electronic device 1000 and control a brightness of the identified light source 1202. For example, based on a result of controlling a brightness of a light source due to the occurrence of the trigger event described above, the electronic device 1000 may control a brightness of the display 1202 of an external device, as the external light source which is controllable by the electronic device 1000.

In addition, the external light source 1202 identified by the electronic device 1000 according to an embodiment of the disclosure may be a light source present in the ambient environment of the light source controlled by the electronic device 1000.

According to an embodiment of the disclosure, as a display of the electronic device 1000 is adjusted to be bright, the external light source 1202 may also be adjusted to be bright based on brightness information of the ambient environment where the sun is blazing down.

A device including the external light source 1202 according to an embodiment of the disclosure may be a device connected to the electronic device 1000 to transmit or receive data, and may include, for example, a smart refrigerator, a smart washing machine, a smart clock, a smart microwave range, and a smart watch. For example, a device including the external light source 1202 may include a device in which a brightness of a display included in each device may be controlled according to the control by the electronic device 1000. The device including the external light source 1202 is not limited thereto and may include various types of devices.

In addition, when a trigger event has occurred according to an embodiment of the disclosure, when an ambient environment of the electronic device 1000 is at night with only street lamp light, a display 1204 of the electronic device 1000 may be adjusted to be dark according to an ambient environment brightness determined based on a captured image 1203 of the ambient environment.

According to an embodiment of the disclosure, as the display 1204 of the electronic device 1000 is adjusted to be dark, the external light source 1202 may also be adjusted to be dark according to the brightness control by the electronic device 1000.

Figure 13:
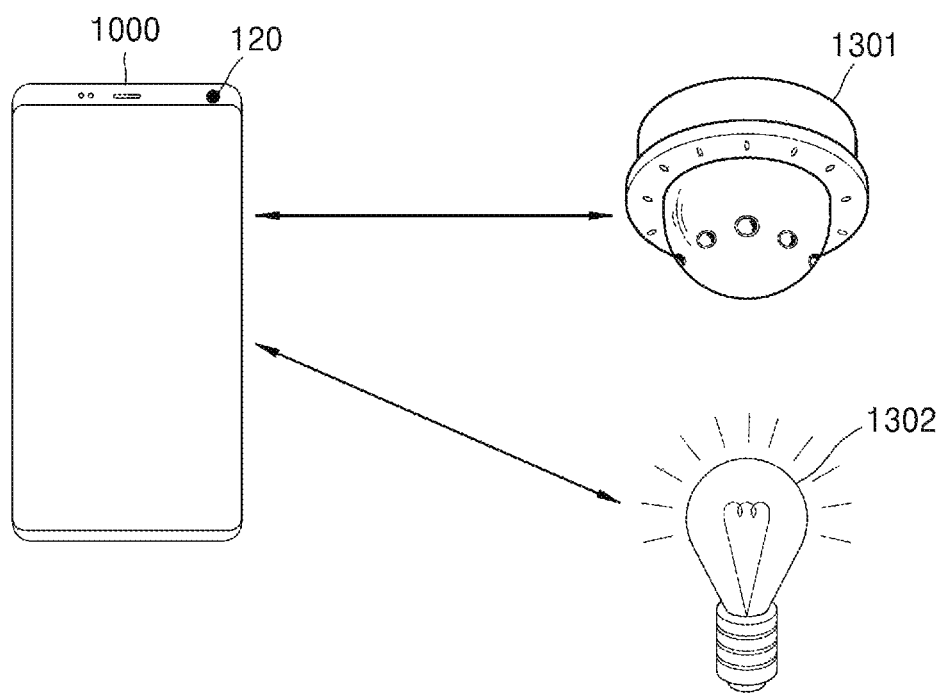
FIG. 13 illustrates an example of controlling a light source, according to an embodiment of the disclosure.

FIG. 13 illustrates an example of controlling a light source, according to an embodiment of the disclosure.

Referring to FIG. 13, the electronic device 1000 may control a light source 1302 based on an image captured using a camera 1301 present outside the electronic device 1000. According to an embodiment of the disclosure, the light source 1302 may be controlled using not only an image captured using a camera included in the electronic device 1000 but also an image captured using an external camera 1301. When an image captured using the external camera 1301 includes an ambient environment of the light source 1302 to be controlled according to an embodiment of the disclosure, the light source 1302 may be controlled based on an image captured using the camera 1301.

For example, the external camera 1301 may be a closed circuit television (CCTV) camera installed inside or outside a house. At least one light source 1302 present in the ambient environment included in an image captured using a CCTV may be controlled based on the image.

As another example, the external camera 1301 may be a camera installed near a headlight of a vehicle. The electronic device 1000 according to an embodiment of the disclosure may be various types of electronic devices capable of controlling a brightness of a headlight. A brightness of a headlight of a vehicle may be controlled based on an image captured using a camera. For example, the electronic device 1000 may determine that an ambient environment of a vehicle is dark (for example, inside a parking lot or at night) based on an image captured using a camera and control a brightness of the headlight of the vehicle according to the brightness of the ambient environment.

As another example, the external camera 1301 may be a camera installed near a streetlamp. The electronic device 1000 according to an embodiment of the disclosure may be various types of electronic devices capable of controlling a brightness of the streetlamp. For example, the camera installed near the streetlamp may be installed for various purposes such as crime prevention, road condition recording and the like, but according to an embodiment of the disclosure, the camera may also be used to control a brightness of the streetlamp.

The electronic device 1000 according to an embodiment of the disclosure may determine an ambient environment brightness based on an image captured using the camera 1301 and control the brightness of the streetlamp. Accordingly, according to an embodiment of the disclosure, without an additional illuminance sensor sensing an ambient environment brightness, the brightness of the streetlamp may be automatically controlled based on an image captured using a camera that is already installed in the vicinity of the streetlamp.

According to an embodiment of the disclosure, by using exposure information of a captured image, an ambient environment brightness may be determined with a higher accuracy than when determining an ambient environment brightness by using only a luminance value of an image, and a brightness of a light source may be controlled according to the determined ambient environment brightness.

An embodiment of the disclosure may also be realized in a form of a recording medium including instructions executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable instruction, a data structure, a program module, or other data. The communication medium may include a computer-readable instruction, a data structure or a program module, and include an arbitrary information transmission medium.

In, addition, terms such as a " . . . unit" used in the specification refer to a hardware component such as a circuit and/or a software component such as processor, which is executed by a hardware component.

While the disclosure has been particularly shown and described with reference to embodiments thereof, it will be understood by those of ordinary skill in the art that various changes in form and details may be made therein without departing from the spirit and scope of the disclosure as defined by the appended claims. The embodiments of the disclosure should be considered in a descriptive sense only and not for purposes of limitation. For example, each element described as a single type may be distributed, and similarly, elements described to be distributed may be combined.

According to an embodiment of the disclosure, by using exposure information of a captured image of an ambient environment, an ambient environment brightness may be determined with a higher accuracy than when determining an ambient environment brightness by using only a luminance value of an image.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a brightness of a light source by an electronic device, the method comprising:
   capturing an image including an ambient environment of the light source;
   obtaining information about an exposure of the captured image;

determining a brightness value of the ambient environment of the light source based on the information about the exposure and at least one luminance value of the captured image; and controlling the brightness of the light source based on the determined brightness value of the ambient environment, wherein the light source includes a display of the electronic device wherein the controlling of the brightness of the light source comprises controlling the brightness of the light source based on data obtained by training based on a record of adjusting, by a user, the brightness of the light source.

2. The method of claim 1, wherein the information about the exposure of the captured image comprises at least one of an aperture value, an ISO sensitivity, or a shutter speed of the image.

3. The method of claim 1, wherein the controlling of the brightness of the light source comprises:

in case the light source is operating in a power save mode, identifying at least one light source present in the ambient environment of the light source; and controlling a brightness of the at least one identified light source such that the brightness of the ambient environment of the light source becomes dark.

4. The method of claim 1, wherein the controlling of the brightness of the light source comprises:

obtaining the at least one luminance value included in the captured image; and controlling the brightness of the light source based on the at least one luminance value and the information about the brightness of the ambient environment.

5. The method of claim 1, wherein data of the captured image is stored in a camera buffer of the electronic device, used in determining the brightness value of the ambient environment of the light source and then deleted from the camera buffer.

6. The method of claim 1, further comprising:

identifying at least one light source that is controllable by the electronic device from among at least one light source present in the ambient environment of the light source as the brightness of the light source is controlled; and controlling a brightness of the at least one identified light source based on a result of controlling the brightness of the light source.

7. The method of claim 1, further comprising:

controlling a brightness of an external light source based on the determined brightness value of the ambient environment and an operating state of the electronic device.

8. An electronic device comprising:

a display;

a camera;

a memory storing one or more instructions; and at least one processor configured to execute the one or more instructions stored in the memory to:

control the camera to capture an image including an ambient environment of the display, obtain information about an exposure of the captured image, determine a brightness value of the ambient environment of the display based on the information about the exposure and a luminance value of the captured image, and control a brightness of the display based on the determined brightness value of the ambient environment, wherein the at least one processor is further configured to execute the one or more instructions stored in the memory to control a brightness of the display based on data obtained by training based on a record of adjusting, by a user, the brightness of the display.

9. The electronic device of claim 8, wherein the information about the exposure comprises at least one of an aperture value, an ISO sensitivity, or a shutter speed of the image.

10. The electronic device of claim 8, wherein the at least one processor is further configured to execute the one or more instructions stored in the memory to:

identify at least one light source present in the ambient environment of the display when the display operates in a power save mode; and control a brightness of the at least one identified light source such that the brightness of the ambient environment of the display becomes dark.

11. The electronic device of claim 8, wherein the at least one processor is further configured to execute the one or more instructions stored in the memory to:

obtain at least one luminance value included in the captured image; and control a brightness of the display based on the obtained at least one luminance value and the information about the brightness of the ambient environment.

12. The electronic device of claim 8, wherein data of the captured image is stored in a camera buffer of the electronic device and used in determining the brightness value of the ambient environment of the display and then deleted from the camera buffer.

13. The electronic device of claim 8, wherein the at least one processor is further configured to execute the one or more instructions stored in the memory to:

identify at least one light source that is controllable by the electronic device from among at least one light source present in the ambient environment of the light source as the brightness of the display is controlled; and control a brightness of the at least one identified light source based on a result of controlling the brightness of the display.

14. The electronic device of claim 8, wherein, in case a trigger event is generated, the electronic device determines the brightness value of the ambient environment of the display.

15. The electronic device of claim 14, wherein the trigger event includes at least one of detection of a change in acceleration, activation of the electronic device, a change of an ambient environment, or a request from an external device.

16. The electronic device of claim 15, wherein the change in the ambient environment is activated by change in weather or by moving the electronic device from outdoors to indoors or vice-versa.

17. A non-transitory computer-readable recording medium having an executable program recorded thereon, wherein the program, when executed by a computer, instructs the computer to perform:

capturing an image including an ambient environment of a light source;

obtaining information about an exposure of the captured image;

determining a brightness value of the ambient environment of the light source based on the information about the exposure and a luminance value of the captured image; and controlling the brightness of the light source based on the determined brightness value of the ambient environment, wherein the light source includes a display of an electronic device, and wherein the controlling of the brightness of the light source comprises controlling the brightness of the light source based on data obtained by training based on a record of adjusting, by a user, the brightness of the light source.

* * * * *